(12) United States Patent
Okuno

(10) Patent No.: US 11,176,720 B2
(45) Date of Patent: Nov. 16, 2021

(54) COMPUTER PROGRAM, IMAGE PROCESSING METHOD, AND IMAGE PROCESSING APPARATUS

(71) Applicant: Axell Corporation, Tokyo (JP)

(72) Inventor: Shuji Okuno, Kashiba (JP)

(73) Assignee: Axell Corporation, Tokyo (JP)

( * ) Notice: Subject to any disclaimer, the term of this patent is extended or adjusted under 35 U.S.C. 154(b) by 43 days.

(21) Appl. No.: 16/698,437

(22) Filed: Nov. 27, 2019

(65) Prior Publication Data

US 2020/0184693 A1 Jun. 11, 2020

(30) Foreign Application Priority Data

Nov. 28, 2018 (JP) .............................. JP2018-222303

(51) Int. Cl.
*G06T 11/60* (2006.01)
*G06T 5/50* (2006.01)
*G06T 3/40* (2006.01)

(52) U.S. Cl.
CPC ............ *G06T 11/60* (2013.01); *G06T 3/4053* (2013.01); *G06T 5/50* (2013.01)

(58) Field of Classification Search
CPC ..... G06T 11/60; G06T 3/4007; G06T 3/4053; G06T 5/50; G06T 3/60; H04N 1/3878
See application file for complete search history.

(56) References Cited

U.S. PATENT DOCUMENTS

| 2001/0033295 | A1* | 10/2001 | Phillips | G06T 11/60 715/723 |
| 2002/0067500 | A1* | 6/2002 | Yokomizo | H04N 1/42 358/1.15 |
| 2007/0097147 | A1* | 5/2007 | Inata | G06T 11/60 345/619 |
| 2007/0133074 | A1* | 6/2007 | Fabrice | G06T 11/60 358/537 |
| 2008/0143740 | A1* | 6/2008 | Wilensky | G06T 11/60 345/619 |

(Continued)

FOREIGN PATENT DOCUMENTS

| JP | 2007-504912 A | 3/2007 |
| JP | 2012-063945 A | 3/2012 |

(Continued)

*Primary Examiner* — Leon Viet Q Nguyen
(74) *Attorney, Agent, or Firm* — Masuvalley & Partners

(57) ABSTRACT

To provide a computer program, an image processing method, and an image processing apparatus that avoid deterioration due to free deformation with respect to a digital image.

The computer program causes a computer to execute a process of receiving editing order including scaling, rotation, shifting, or distortion with respect to a digital image to be processed, identifying a target resolution of the digital image to be processed, generating a temporary reference image with a resolution predetermined times the target resolution based on the digital image, performing rotation, shifting, or distortion in the received editing with respect to the temporary reference image, and outputting the digital image with the target resolution by performing sampling at a rate corresponding to the target resolution with respect to the edited temporary reference image.

5 Claims, 5 Drawing Sheets

(56) References Cited

U.S. PATENT DOCUMENTS

| | | | |
|---|---|---|---|
| 2008/0144970 A1* | 6/2008 | Wilensky | G06K 9/48 |
| | | | 382/283 |
| 2009/0161169 A1* | 6/2009 | Muramatsu | H04N 1/40068 |
| | | | 358/447 |
| 2010/0123726 A1* | 5/2010 | Ito | G06T 11/60 |
| | | | 345/501 |
| 2011/0032570 A1* | 2/2011 | Imaizumi | H04N 1/387 |
| | | | 358/1.15 |
| 2012/0099762 A1 | 4/2012 | Kunieda | |
| 2013/0120439 A1* | 5/2013 | Harris | G06T 13/80 |
| | | | 345/619 |
| 2015/0279030 A1 | 10/2015 | Harada | |
| 2016/0110852 A1* | 4/2016 | Yanai | G06T 5/20 |
| | | | 382/264 |
| 2016/0292831 A1 | 10/2016 | Bogan | |
| 2016/0300327 A1* | 10/2016 | Kriener | H04N 5/23293 |
| 2018/0365877 A1* | 12/2018 | Watola | G06T 5/006 |
| 2020/0302576 A1* | 9/2020 | Xu | G06T 3/4053 |

FOREIGN PATENT DOCUMENTS

| | | |
|---|---|---|
| JP | 2014-222442 A | 11/2014 |
| JP | 2015-188738 A | 11/2015 |
| JP | 2016-197857 A | 11/2016 |
| WO | 2005/024722 A2 | 3/2005 |

\* cited by examiner

COMPUTER PROGRAM, IMAGE PROCESSING METHOD, AND IMAGE PROCESSING APPARATUS

FIELD

The present invention relates to a computer program, an image processing method, and an image processing apparatus that causes a computer to perform image processing for avoiding deterioration due to free deformation with respect to a digital image.

BACKGROUND

In a digital image, pixels are arranged in a matrix, and an image is expressed by colors and pixel values such as luminance of respective pixels. Therefore, when a digital image is rotated with an angle other than multiples of 90 degrees, interpolation processing becomes necessary, and the image quality deteriorates such as an occurrence of blurring.

With respect to the above problem, conventionally, there has been proposed a method of prohibiting rotation when deterioration of detailed portions is not acceptable, or avoiding rotation with an arbitrary angle as much as possible, for example, in a case in which detection processing is performed by using a digital image rotated with an angle other than multiples of 90 degrees, performing processing by using a plurality of digital images rotated with different angles (for example, Japanese Patent Application Laid-open No. 2015-188738 and Japanese Patent Application Laid-open No. 2012-063945).

Further, in a case of an image, different from sound, a digital image includes a step edge or the like in which a pixel value rapidly changes. In this case, a high frequency component exceeding a sampling theorem may be generated. When a digital image is shifted only by half a pixel, pixel values of respective processed pixels are obtained based on an average value or the like of the pixel values of peripheral pixels before the processing, thereby causing deterioration of the image quality due to occurrence of blurring or the like. That is, the digital image is not shift-invariant, different from digital sound.

CITATION LIST

Patent Literature

Patent Literature 1: Japanese Patent Application Laid-open No. 2015-188738
Patent Literature 2: Japanese Patent Application Laid-open No. 2012-063945

However, it is desired to realize lossless free deformation including rotation with an arbitrary angle or shifting with an arbitrary distance with respect to a digital image.

The present invention has been made in view of the above circumstances, and an object of the present invention is to provide a computer program, an image processing method, and an image processing apparatus that can avoid deterioration due to free deformation with respect to a digital image.

SUMMARY OF THE INVENTION

A computer program according to the present invention causes a computer to execute a process of receiving editing order including rotation, shifting, or distortion with respect to a digital image to be processed, identifying a target resolution of the digital image to be processed, generating a temporary reference image with a resolution predetermined times the resolution of the target resolution based on the digital image, performing the received editing order with respect to the temporary reference image, and outputting a digital image with the target resolution by performing sampling at a rate corresponding to the target resolution with respect to the edited temporary reference image.

An image processing method of the present invention includes receiving editing order of scaling, rotation, shifting, or distortion with respect to a digital image to be processed, identifying a target resolution of the digital image to be processed, generating a temporary reference image with a resolution predetermined times the resolution of the target resolution based on the digital image, performing the received editing order with respect to the temporary reference image, and outputting a digital image with the target resolution by performing sampling at a rate corresponding to the target resolution with respect to the edited temporary reference image.

An image processing apparatus of the present invention includes an operation unit that receives editing order of scaling, rotation, shifting, or distortion with respect to a digital image to be processed, and an image processing unit that generates a temporary reference image with a resolution predetermined times an identified target resolution with respect to the digital image to be processed. The image processing unit performs editing order received by the operation unit with respect to the temporary reference image, and outputs a digital image with the target resolution by performing sampling at a rate corresponding to the target resolution with respect to the edited temporary reference image.

According to the computer program, the image processing method, and the image processing apparatus of the present invention, image processing that realizes free deformation including rotation with an arbitrary angle other than multiples of 90 degrees becomes possible.

DESCRIPTION OF EMBODIMENTS

An image processing apparatus, an image processing method, and a computer program according to the present application are described below with reference to the drawings that illustrate an embodiment.

Figure 1:
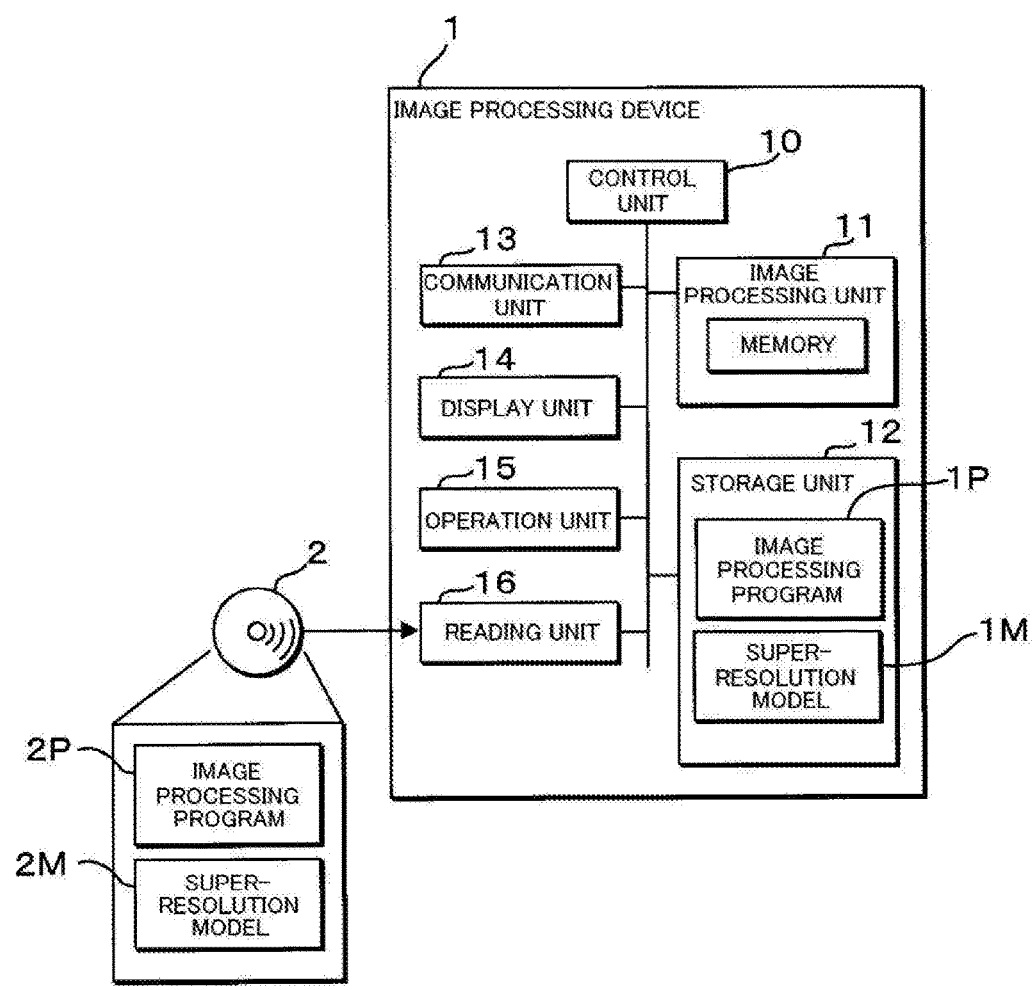
FIG. 1 is a block diagram illustrating a configuration of an image processing apparatus according to the present embodiment.

FIG. 1 is a block diagram illustrating a configuration of an image processing apparatus 1 according to the present embodiment. The image processing apparatus 1 includes a control unit 10, an image processing unit 11, a storage unit 12, a communication unit 13, a display unit 14, an operation unit 15, and a reading unit 16. The image processing apparatus 1 and an operation in the image processing apparatus 1 are described as being realized as one computer. However, the configuration can be such that processing is distributed to a plurality of computers.

The control unit 10 controls constituent units of the device by using a processor such as a CPU (Central Processing Unit), a memory, and the like, to realize various functions. The image processing unit 11 performs image processing in response to a control instruction from the control unit 10 by using a GPU (Graphics Processing Unit) or a processor such as a dedicated communication circuit and a memory. The control unit 10 and the image processing unit 11 can be integrated hardware. Further, the control unit 10 and the image processing unit 11 can be configured as single hardware (SoC: System On a Chip) in which a processor such as a CPU or a GPU, a memory, the storage unit 12, and the communication unit 13 are integrated.

A hard disk or a flash memory is used as the storage unit 12. The storage unit 12 has stored therein an image processing program 1P. The control unit 10 and the image processing unit 11 cause a general-purpose computer to function as a specific image processing apparatus 1 according to processing based on the image processing program 1P (the flowchart in FIG. 2). Further, the storage unit 12 has stored therein a super-resolution model 1M, and parameter information or the like including a weighting factor of a neural network included in the super-resolution model 1M. The image processing unit 11 can output a digital image with the resolution thereof being increased than an original resolution based on the super-resolution model 1M stored in the storage unit 12.

The communication unit 13 is a communication module that realizes communication connection to a communication network such as the Internet. The communication unit 13 uses a network card, a wireless communication device, or a carrier communication module.

The display unit 14 uses a liquid crystal panel, an organic EL (Electro Luminescence) display, or the like. The display unit 14 can display an image by the processing in the image processing unit 11 in response to an instruction from the control unit 10.

The operation unit 15 includes a user interface such as a keyboard, a mouse, and the like. A physical button provided in a casing may be used, and a software button or the like displayed on the display unit 14 may be used. The operation unit 15 notifies the control unit 10 of information on an operation by a user.

The reading unit 16 can read an image processing program 2P and a super-resolution image 2M stored in a recording medium 2 using an optical disk or the like, for example, by using a disk drive. The image processing program 1P and the super-resolution image 1M stored in the storage unit 12 can be duplicates obtained by the control unit 10 by duplicating the image processing program 2P and the super-resolution image 2M read from the recording medium 2 by the reading unit 16 to the storage unit 12.

The control unit 10 of the image processing apparatus 1 performs image processing with respect to image data of a digital image based on the image processing program 1P stored in the storage unit 12. Particularly, the control unit 10 receives a user operation, and realizes generation or editing of a digital image (editing order) based on the image processing program 1P.

Figure 2:
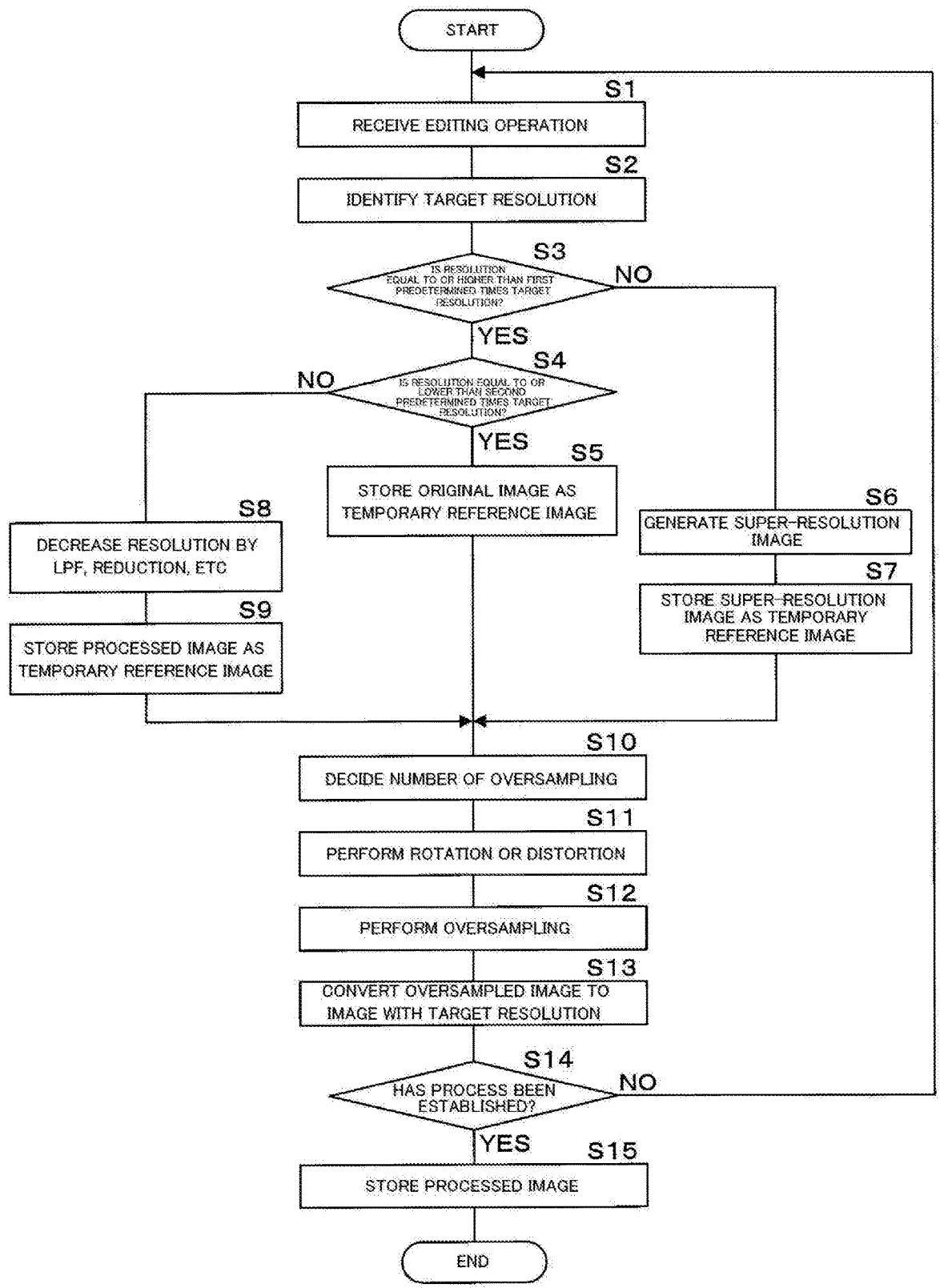
FIG. 2 is a flowchart illustrating an example of a process procedure of the image processing apparatus.

FIG. 2 is a flowchart illustrating an example of a process procedure of the image processing apparatus 1. The control unit 10 performs the following processes based on the image processing program 1P.

The control unit 10 receives a free deformation operation including scaling, rotation, shifting, or distortion by the operation unit 15 (editing order) with respect to a digital image (original) to be processed (Step S1). The control unit 10 identifies a target resolution after the processing based on the received operation (Step S2).

At Step S2, the control unit 10 initially identifies a resolution same as the resolution of the digital image (original) before the processing as a target resolution. When scaling is included in the operation received at Step S1, the control unit 10 identifies the resolution of the digital image after scaling as the target resolution.

As another example, in order to generate digital data such as a document or an image, when a digital image is to be imported to the digital data as one object image, the control unit 10 designates the one object image as a digital image to be subjected to image processing. In this case, the control unit 10 initially identifies the resolution of the original digital image (original) as the target resolution with respect to the imported object image at Step S2. Further, in a case in which a digital image is generated based on the image processing program 1P, the control unit 10 may receive setting of a resolution (a canvas size) of the digital image to be generated, and identify the received resolution as the target resolution.

As another example at Step S2, in a case in which an animation image of rotating or deforming a digital image is generated, the control unit 10 may identify approximately half the resolution of the original digital image (original) as the target resolution. Alternatively, the control unit 10 may identify the target resolution according to whether the processed digital image is a moving image, or according to the type and the mode of the original digital image, for example, whether the digital image is a photograph (a video picture), an illustration, or a cartoon, or the gradation of the original digital image.

The control unit 10 determines whether the resolution of the original digital image (original) is equal to or higher than first predetermined times the resolution of the target resolution (for example, twice, $\sqrt{2}$ times, or 1.5 times), based on the resolution of the original digital image (original) and the target resolution decided at Step S1 (Step S3). Upon determination that the resolution is equal to or higher than first predetermined times the resolution of the target resolution (S3: YES), the control unit 10 determines whether the resolution of the original digital image (original) is equal to or lower than second predetermined times the resolution of the target resolution (higher than first predetermined times) (Step S4). At Step S4, upon determination that the resolution of the original digital image is equal to or lower than second predetermined times the resolution of the target resolution (S4: YES), the control unit 10 temporarily stores the original digital image (original) with the original resolution in a built-in memory or the storage unit 12 as a temporary reference image.

At Step S3, upon determination that the resolution is lower than first predetermined times the resolution of the target resolution (S3: NO), the control unit 10 generates a super-resolution image with a resolution first predetermined times the resolution of the target resolution with respect to the original digital image (original), according to processing by the image processing unit 11 based on the super-resolution model 1M (Step S6). The control unit 10 temporarily stores the generated super-resolution image as the temporary reference image in a built-in memory or the storage unit 12 (Step S7).

At Step S3, upon determination that the resolution of the original digital image is higher than the second predetermined times the target resolution (S4: NO), the control unit 10 lowers the resolution of the original digital image. The image processing unit 11 performs Low-pass filtering or simply performs scaling so that resolution of the original digital image (original) is the resolution second predetermined times the target resolution (Step S8). The control unit 10 temporarily stores the image after the process at Step S8 as the temporary reference image in a built-in memory or the storage unit 12 (Step S9). It is of note that Step S8 may be omitted, and even if the original digital image has a resolution exceeding second predetermined times the target resolution, the original digital image may be set directly as the temporary reference image, and the sampling rate may be adjusted at the subsequent Step S10.

Next, the control unit 10 decides an oversampling rate with respect to the temporary reference image according to the size of rotation or distortion (Step S10). The oversampling rate is determined so that the oversampling rate that can handle the resolution of the temporary reference image and is up to approximately $\sqrt{2}$ times thereof, for example. When the temporary reference image has a resolution twice the target resolution, the oversampling rate may set three times the sampling rate for the target resolution, thereby calculation can be simplified.

The control unit 10 controls the image processing unit 11 to perform rotation or distortion process received at Step S1 with respect to the temporary reference image stored in the built-in memory or the storage unit 12 (Step S11). The control unit 10 performs oversampling at the oversampling rate decided at Step S10 (Step S12). The control unit 10 converts the oversampled image to an image with the target resolution and stores the image in the built-in memory or the storage unit 12 (Step S13).

The control unit 10 judges whether the process with respect to the digital image to be processed has been established (Step S14). Upon determination that the process has not been established (S14: NO), the control unit 10 returns the process to Step S1. Upon determination that the process has been established (S14: YES), the control unit 10 stores the processed digital image in the storage unit 12 as an output result (Step S15) to end the process. At Step S15, the control unit 10 erases the stored temporary reference image.

Figure 3:
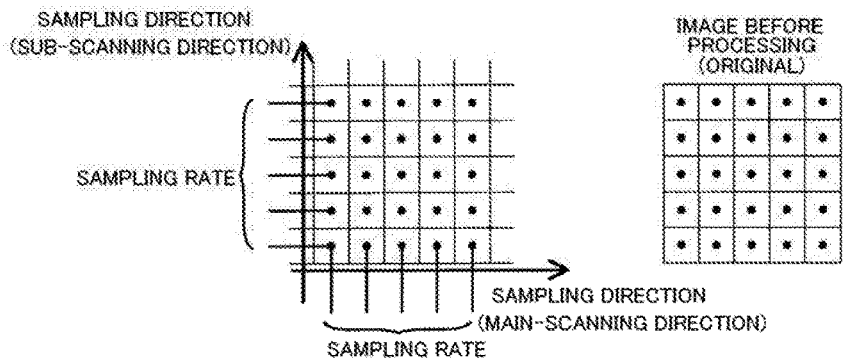
FIG. 3 is an explanatory diagram illustrating an outline of processing by the image processing apparatus according to the present embodiment.
Figure 3:
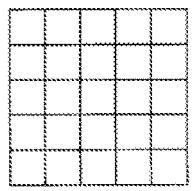
Figure 3:
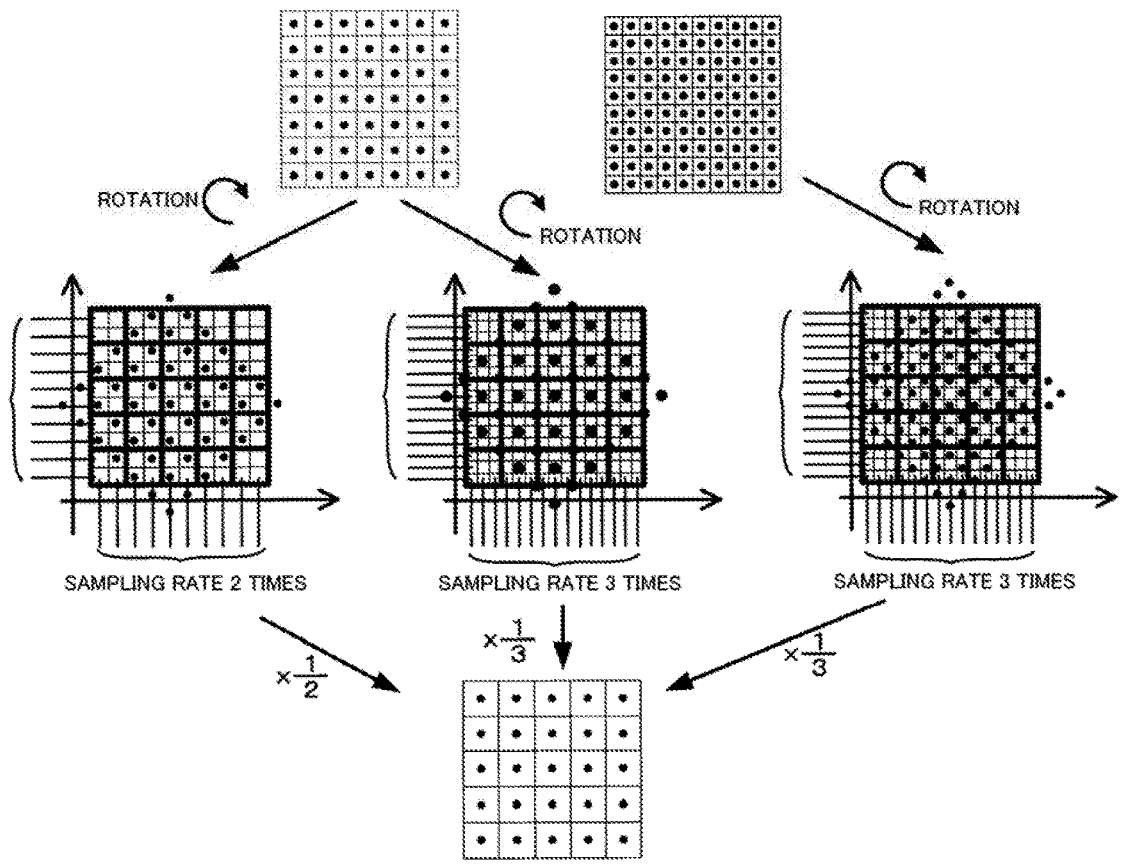
Figure 4:
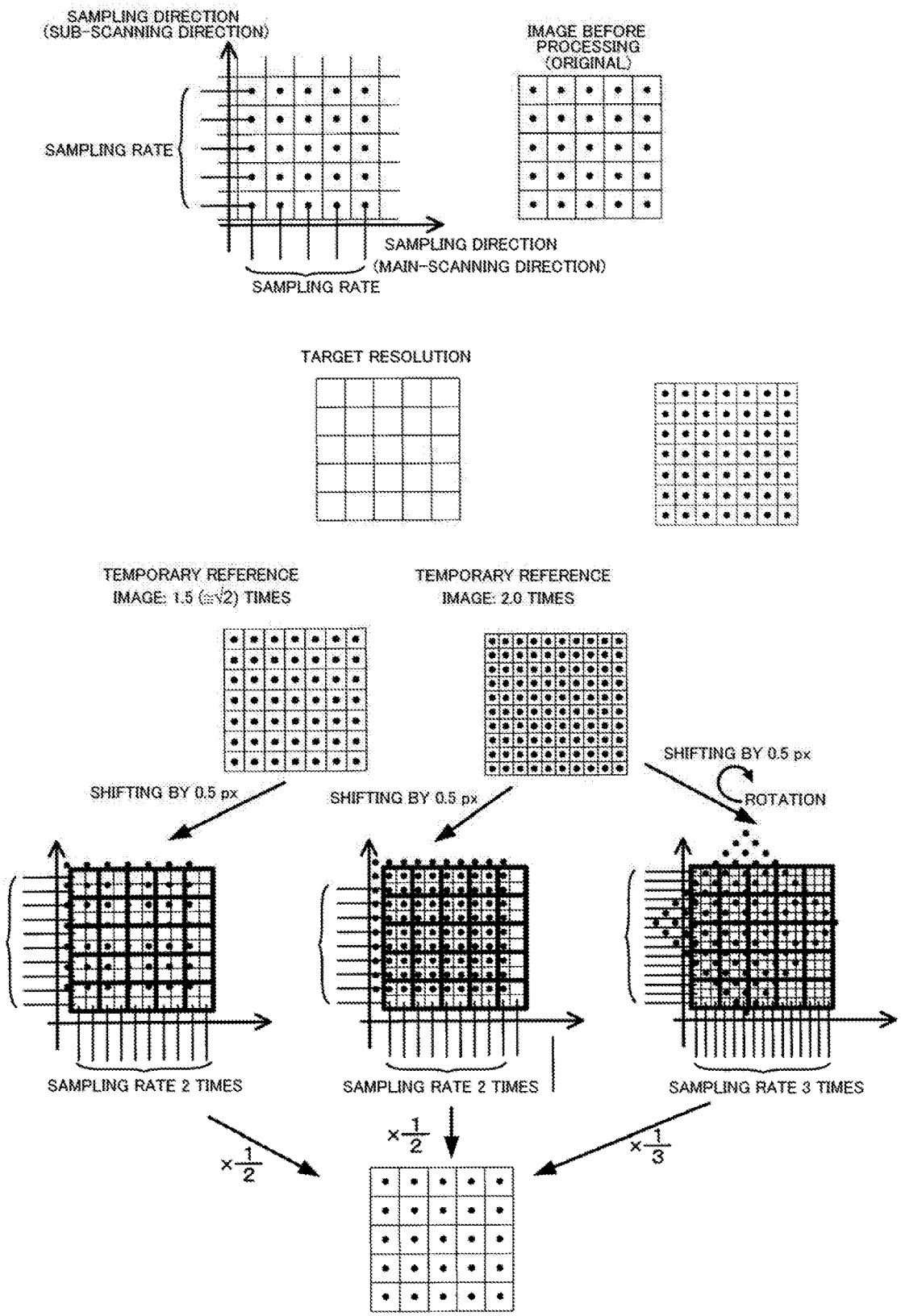
FIG. 4 is an explanatory diagram illustrating an outline of the processing by the image processing apparatus according to the present embodiment.
Figure 5:
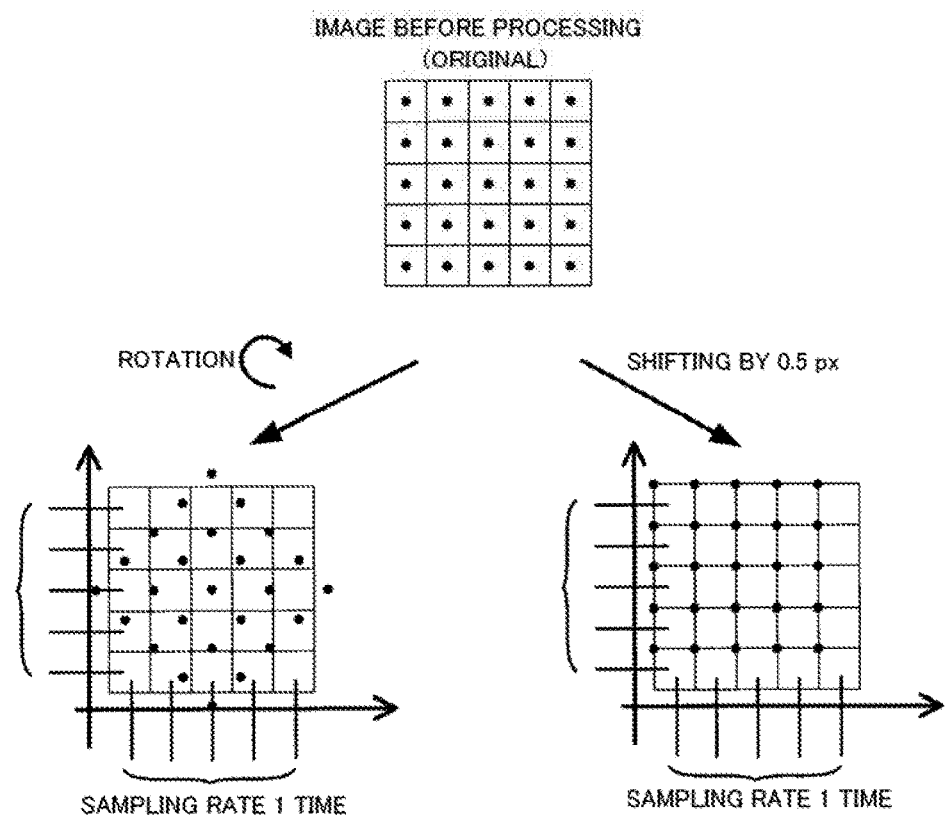
FIG. 5 is an explanatory diagram illustrating an outline of an image editing process in a comparative example.

The image processing by the image processing apparatus 1 illustrated in the flowchart in FIG. 2 is described with reference to FIG. 2. FIG. 3 and FIG. 4 are explanatory diagrams illustrating an outline of the processing by the image processing apparatus 1 according to the present embodiment. FIG. 5 is an explanatory diagram illustrating an outline of an image editing process in a comparative example.

As illustrated in FIG. 5, in a case in which generation of a temporary reference image and oversampling are not performed with respect to an editing process of rotating an image with an arbitrary angle other than 90 degrees (45 degrees in FIG. 5), aliasing and blurring occur because the sampling direction deviates from the sampling direction of the original digital image. Similarly, in a case in which generation of a temporary reference image and oversampling are not performed with respect to an editing process of shifting an image by 0.5 pixel, blurring occurs because of not being shift-invariant.

Meanwhile, in the processing by the image processing apparatus 1 according to the present embodiment, after a temporary reference image with an appropriate resolution of approximately $\sqrt{2}$ times or twice is generated respectively with respect to a rotation operation in FIG. 3 and a shifting operation by 0.5 pixel in FIG. 4, and oversampling is performed at an appropriate rate of approximately two to three times higher than the sampling rate for the resolution of the temporary reference image, the temporary reference image is converted into a digital image with the target resolution. Accordingly, at the time of oversampling, it becomes possible to avoid aliasing caused by misalignment in the sampling direction due to rotation, and reduce blurring generated by a calculation process using pixel values of peripheral pixels, thereby enabling to suppress deterioration.

It should be understood that the embodiment disclosed above is only an example in all respects and is not a limitation to the present invention. It is intended that the scope of the present invention is not defined by the meaning described above but by the scope of claims and includes all variations in the meaning and the scope which are equivalent to the scope of claims.

REFERENCE SIGNS LIST

1 image processing apparatus
10 control unit
11 image processing unit
12 storage unit
1P image processing program

What is claimed is:
1. An image processing method including a process of:
receiving editing order including rotation, shifting, or distortion with respect to a digital image to be processed by an operation unit comprising a user interface having a key board, a mouse, a physical button and a software button;
identifying a target resolution of the digital image to be processed by a control unit comprising a central processing unit, a memory;
storing a temporary reference image with a resolution predetermined times the target resolution based on the digital image by an image processing unit comprising a graphics processing unit or a processor having a dedicated communication circuit and a memory;
performing received editing order with respect to the temporary reference image by said image processing unit; and
outputting the digital image with the target resolution by performing sampling at a sampling rate higher than the predetermined times the target resolution, with respect to the edited temporary reference image by said image processing unit controlled by said control unit.
2. An image processing apparatus comprising:
an operation unit comprising a user interface having a key board, a mouse, a physical button and a software button that receives editing order including rotation, shifting, or distortion with respect to a digital image to be processed; and
an image processing unit comprising a graphics processing unit or a processor having a dedicated communication circuit and a memory that stores a temporary reference image with a resolution predetermined times an identified target resolution with respect to the digital image to be processed, wherein the image processing unit
performs editing order received by the operation unit with respect to the temporary reference image, and
outputs the digital image with the target resolution by performing sampling at a sampling rate higher than the predetermined times the target resolution with respect to the edited temporary reference image.

3. The image processing method according to claim 1, wherein the method further causing the image processing unit to execute a process of:
deciding an oversampling rate with a resolution equal to or higher than that of the temporary reference image according to the editing order, with respect to the edited temporary reference image;
performing oversampling at the decided oversampling rate; and
converting an image acquired by oversampling into a digital image with the target resolution.

4. The image processing method according to claim 3, wherein the predetermined times is twice, and the oversampling rate is three times.

5. The image processing method according to claim 1, wherein when a resolution of the digital image to be processed is lower than the predetermined times the target resolution,
the image processing unit executing a process of:
generating a super-resolution image with a resolution that is the predetermined times based on the digital image; and
designating the generated super-resolution image as the temporary reference image.

\* \* \* \* \*